(12) United States Patent
Ouyang

(10) Patent No.: US 6,200,012 B1
(45) Date of Patent: Mar. 13, 2001

(54) FIBER OPTIC LIGHT SOURCE HAVING A DUAL CHARACTERISTIC FAN

(75) Inventor: Xing Ouyang, Orlando, FL (US)

(73) Assignee: Super Vision International, Inc., Orlando, FL (US)

( * ) Notice: Subject to any disclaimer, the term of this patent is extended or adjusted under 35 U.S.C. 154(b) by 0 days.

(21) Appl. No.: 09/376,040

(22) Filed: Aug. 17, 1999

(51) Int. Cl.[7] .................................................... F21V 29/00
(52) U.S. Cl. ......................... 362/580; 362/551; 362/294; 362/373
(58) Field of Search .................................... 362/551, 580, 362/552, 294, 373

(56) References Cited

U.S. PATENT DOCUMENTS

| 5,333,228 | 7/1994 | Kingstone et al. . |
| 5,528,714 | 6/1996 | Kingstone et al. . |
| 5,838,860 | 11/1998 | Kingstone et al. . |

Primary Examiner—Sandra O'Shea
Assistant Examiner—Ismael Negron
(74) Attorney, Agent, or Firm—Holland & Knight LLP; David G. Maire; James H. Beusse

(57) ABSTRACT

A fiber optic light source cooled by a tube-axial fan having a blocking device covering a portion of its outlet. The blocking device generates a relatively higher velocity stream of cooling air just downstream of the blocking device in the direction of the rotation of the fan blades, while maintaining the velocity of cooling air is produced across the remainder of the fan outlet relatively unchanged. The higher velocity cooling air is used to cool the fiber optic cable ends while the relatively lower velocity cooling air is used to cool the bulb and other components of the light source. The dual characteristics of the cooling air produced by the fan provides an efficient, low noise cooling source that facilitates higher levels of light input without the problem of melting of the fiber optic cable ends.

20 Claims, 1 Drawing Sheet

FIBER OPTIC LIGHT SOURCE HAVING A DUAL CHARACTERISTIC FAN

BACKGROUND OF THE INVENTION

Fiber optic lighting systems are used in a variety of applications to provide a cool, flexible, safe source of light. The assignee of the present invention provides fiber optic light systems for use in signs, displays, swimming pools and general area lighting. One such fiber optic light system for providing multi-color light effects is described in U.S. Pat. No. 5,528,714 issued Jun. 18, 1996, to Kingstone et al., assigned to the assignee of the present invention and incorporated by reference herein. A fiber optic lighting system may typically include a light source and a fiber optic cable bundle for transmitting light from the light source to a location remote from the light source. The light source may typically include an enclosure containing a light bulb, a means for securing the end of a fiber optic cable bundle near the light bulb, a power supply or other electronic equipment, and a fan for providing cooling air to the enclosure.

One of the limiting characteristics of a fiber optic light system is the amount of light that can be produce from such systems. Numerous advances have been made to improve the optical performance of the fiber optic cables in order to reduce the losses in the system. For example, U.S. Pat. No. 5,333,228 issued Jul. 26, 1994, to Kingstone, assigned to the assignee of the present invention and incorporated by reference herein, describes a fiber optic cable having a reflective center core for reflecting inwardly directed emissions back outwardly.

It is known to increase the amount of light introduced at the inlet end of the fiber optic cable bundle in order to increase the amount of light produced by the system. However, light bulbs used to produce such light, for example incandescent and halogen lamps, produce a significant amount of heat energy along with the visible light energy. As the power of the light bulb is increased and as the bulb is placed closer to the ends of the fiber optic cables, it becomes increasingly difficult to provide cooling for the cable ends. It is known that plastic cable fibers will melt at approximately 125 degrees Centigrade. However, local melting of the cable will cause a depression in the cable end wherein cooling air becomes stagnant and local heating will intensify. Even a small local hot spot will quickly destroy the functionality of a cable fiber. Therefore, it is necessary to provide an additional margin of safety against melting. U.S. Pat. No. 5,838,860 issued Nov. 17, 1998, to Kingstone et al., assigned to the assignee of the present invention and incorporated by reference herein, describes the use of a plate of heat absorbing material as part of a temperature control scheme within the enclosure of a fiber optic illumination system. In many designs the factor limiting the brightness that can be achieved in the cable is the cooling of the cable ends.

In a light source for a fiber optic system it is necessary to provide local cooling to the end of the cable bundle fibers as well as general cooling for the bulb and other components included in the light source enclosure. The heat generated by the bulb and other electronics within the enclosure necessitates the supply of a high volume of cooling air. However, for cooling the cable end the volume of air is not as critical as the velocity of the air, as a result of the geometry of the cable end and the relatively poor thermal conductivity of the air. In order to provide the required velocity for cooling the fiber end, prior art systems have used fans that are much larger than necessary for the general cooling requirements. As a result, such fans have proven to be noisy and have consumed more electrical power than is necessary for the overall application requirements. Alternatively, two air moving devices have been used in a single light source; a fan for general cooling and a blower to provide a source of high velocity cooling air for the cable ends.

Furthermore, prior art fiber optic cable systems incorporating the higher light output of metal halide lamps have been limited. Although these lamps produce more visible light than incandescent and halogen lamps, they also produce more infrared and ultraviolet energy, thereby making it more difficult to provide the necessary cooling to the fiber ends in order to take advantage of these higher output lamps.

What is necessary is an improved cooling arrangement for a fiber optic lighting system. Therefore, it is an object of this invention to provide a cooling arrangement for a fiber optic light source that provides adequate cooling for the cable end without providing excess general cooling. It is a further object of this invention to provide a fiber optic light source that incorporates a metal halide light bulb without the danger of melting of the fiber optic cable bundle ends. It is a further object of this invention to provide a more efficient and more quiet cooling arrangement for a fiber optic cable light source.

SUMMARY OF THE INVENTION

These and other objects of the present invention are satisfied in a fiber optic lighting device having an enclosure; a fiber optic cable having an end disposed within the enclosure; a light bulb disposed proximate the end of the fiber optic cable; a fan assembly having an outlet for directing a flow of cooling air into the enclosure; and a blocking device disposed proximate the outlet of the fan assembly for blocking the flow of cooling air through a portion of the outlet of the fan assembly to separate the flow of cooling air into a higher velocity portion for cooling the cable end and a lower velocity portion.

DETAILED DESCRIPTION OF THE INVENTION

Figure 1:
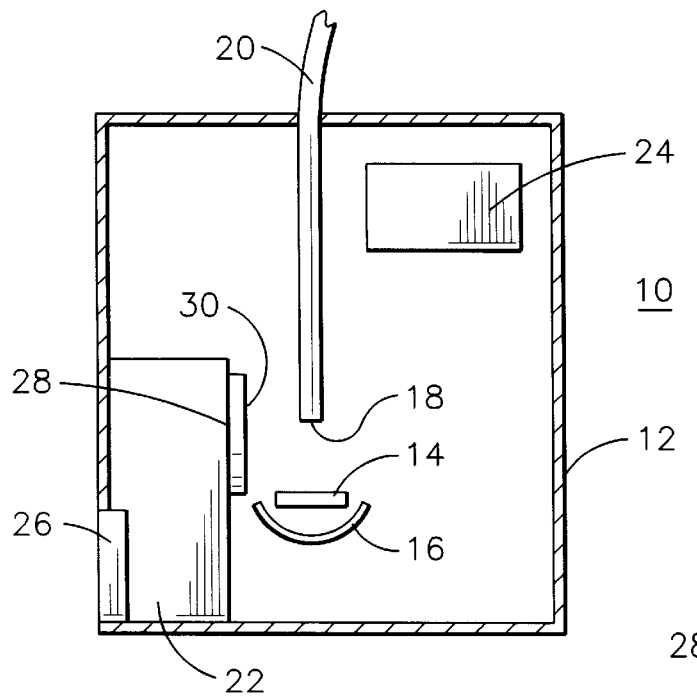
FIG. 1 is a schematic illustration of a fiber optic lighting system incorporating the present invention.

FIG. 1 illustrates a light source 10 for a fiber optic lighting system incorporating the present invention. An enclosure 12 houses a lamp 14 and reflector 16 used to project light onto the end 18 of a fiber optic cable 20. Cable 20 may be a single fiber optic cable or a plurality of fiber optic cables grouped into a bundle. Cable 20 may lead to a fixture (not shown) where the light is projected out of the cable 20. Cable 20 may be, for example, a Side-Glow™ or and End-Glow™ cable as sold by the assignee of the present invention Enclosure 12 also houses a fan assembly 22 used to provide a flow of cooling air used to remove heat from the lamp 14, cable end 18, and power supply or other equipment 24 located within the enclosure 12.

Fan assembly 22 has an inlet 26 in fluid communication with the ambient environment, and an outlet 28 for directing a flow of cooling air into the interior of the enclosure 12. A blocking device 30 is disposed proximate the outlet 28 of the fan assembly 22 for blocking the flow of cooling air through a portion of the outlet 28. Blocking device 30 is shown as a plate, however, it may take other shapes. Blocking device 30 may be attached to fan assembly 22 and/or enclosure 12.

Figure 2:
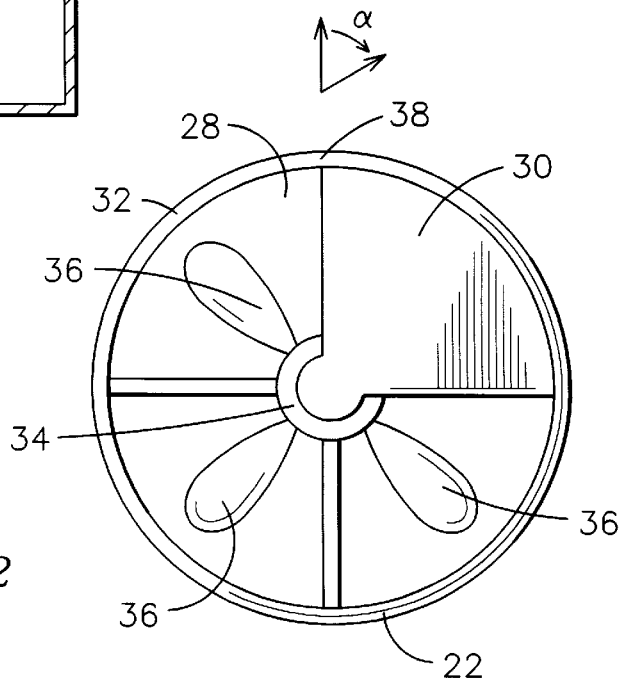
FIG. 2 is an end view of the outlet of a fan assembly incorporating a blocking device in accordance with the present invention.

As may be seen in FIG. 2, fan assembly 22 may be a tube-axial fan having a generally circular outer tube 32 and a centrally located electric motor 34 used to rotate a plurality of blades 36. FIG. 2 is an end view of the generally circular outlet 28 of fan assembly 22 of FIG. 1. Such a fan assembly 22 may be procured from Sumowealth Electric Mach. Ind. Co. Ltd. under model designation Sunon SP100A (A166).

FIG. 2 also illustrates the location and configuration of blocking device 30. In the embodiment shown, blocking device 30 is a plate covering approximately one-quarter of the area of outlet 28. Depending upon the design of the specific fiber optic light source, it may be desirable to have blocking device 30 cover no more than one-quarter of the area of outlet 28 in order to ensure that the total flow of cooling air is not reduced significantly. Alternatively, in an application where the cooling of the cable end 18 needs to be maximized, it may be desirable to have blocking device 30 cover at least one-quarter of the area of outlet 28.

Figure 3:
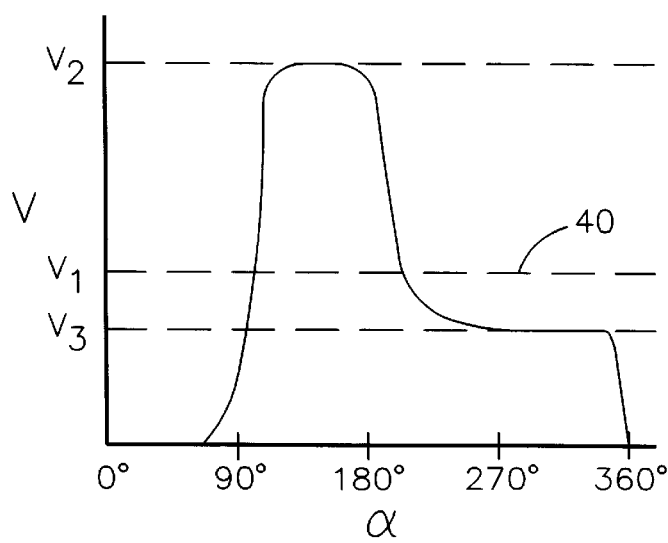
FIG. 3 is a graphical presentation of the velocity of the cooling air supplied across the outlet of the fan assembly of FIG. 2.

The operation of the cooling arrangement illustrated in FIGS. 1 and 2 will now be explained so that the advantage of the applicant's invention may be more clearly appreciated. Motor 34 rotates fan blades 36 in the direction of arrow R as shown in FIG. 2. The rotation of the blades 36 generates a flow of cooling air through outlet 28. FIG. 3 illustrates the velocity V of the cooling air passing through outlet 28 as a function of the angular displacement around the generally circular outlet 28 beginning at point 38. Without any blocking device installed, fan assembly 22 will provide cooling air at approximately the same velocity $V_1$ around the entire outlet 28, as shown by dashed line 40 in FIG. 3. However, with a blocking device 30 installed over the first quadrant of outlet 28, as shown in FIG. 2, the average velocity in that quadrant is zero, since the flow of cooling air is blocked. Notice, however, that the peak velocity $V_2$ in the quadrant immediately downstream of the blocking device in the direction R of rotation of the blades of the fan assembly is higher than the unblocked velocity $V_1$. It is also higher than the average velocity $V_3$ in the remaining half of the outlet 28, and it is higher than the overall average velocity of cooling air around the entire outlet. This higher velocity is the result of a buildup of pressure within the outer tube 32 behind the obstruction of blocking device 30, and the sudden release of that pressure as the cooling air is swept past the obstruction by the rotation of the fan blades 36. The specific increase in velocity that may be obtained with such a blocking device 30 will depend upon the operating parameters of the fan assembly 22 and the size and location of blocking device 30. In one embodiment, blocking device 30 may be sized to provide a velocity $V_2$ that is at least 25% higher than $V_3$. With a Sunon SP100A (A166) fan assembly, the applicant has found that by blocking approximately one quarter of the outlet 28 as illustrated in FIG. 2, the peak velocity $V_2$ can be increased at least 40% over velocity $V_3$ produced in the lower velocity portion of the outlet 28. Thus, the addition of an obstruction such as blocking device 30 in the outlet 28 of fan assembly 22 serves to separate the flow of cooling air into a higher velocity portion immediately downstream of the obstruction and a lower velocity portion in the remainder of the outlet 28.

Advantageously, the fan assembly 22 is located within enclosure 12 so that the higher velocity cooling air exiting the outlet 28 is directed to cool the end 18 of the fiber optic cable 20. The lower velocity cooling air may be directed to the lamp 14 or other equipment 24 of the fiber optic light source 10. Although the addition of blocking device 30 will lower the total volume of cooling air supplied by fan assembly 22, in most applications the selection of the fan assembly 22 is not limited by the requirement for general cooling, and this reduction in total flow is therefore not significant. By improving the capability of fan assembly 22 to provide high velocity cooling air for cooling of lamp 14, the overall efficiency of the cooling arrangement is improved. This improvement may be used to reduce the size, noise and/or power requirements of the fan motor 34 or fan assembly 22, or it may be used to increase the light output of lamp 14 or the distance of the lamp 14 from the cable end 18 without the melting of cable end 18. Importantly, in a fiber optic lighting device designed in accordance with the present invention, lamp 14 may be selected to be a metal halide light bulb in many applications where previously a metal halide light bulb could not be used. This improvement also makes it possible to design an effective cooling arrangement for high light output levels using only a single air moving device.

The embodiments described above and in the figures are provided for the purpose of illustration, not limitation. Accordingly, the full scope of the applicant's invention is as claimed below.

I claim as my invention:

1. A fiber optic lighting device comprising:
   an enclosure;
   a fiber optic cable having an end disposed within the enclosure;
   a lamp disposed proximate the end of the fiber optic cable;
   a fan assembly having an outlet for directing a flow of cooling air into the enclosure;
   a blocking device disposed proximate the outlet of the fan assembly for blocking the flow of cooling air through a portion of the outlet of the fan assembly to separate the flow of cooling air into a higher velocity portion for cooling the cable end and a lower velocity portion.

2. The device of claim 1, wherein the blocking device comprises a plate covering a portion of the outlet of the fan assembly.

3. The device of claim 1, wherein the blocking device comprises a plate attached to the fan assembly.

4. The device of claim 1, wherein the blocking device comprises a plate attached to the enclosure.

5. The device of claim 1, wherein the blocking device blocks the flow of cooling air through no more than one quarter of the area of the outlet.

6. The device of claim 1, wherein the blocking device blocks the flow of cooling air through at least one quarter of the area of the outlet.

7. The device of claim 1, wherein the fan assembly comprises a tube-axial fan.

8. The device of claim 1, wherein the lamp comprises a metal halide light bulb.

9. A cooling arrangement for a fiber optic light source having a lamp and a fiber optic cable end located proximate the lamp, the cooling arrangement comprising:
   a fan assembly having an outlet disposed to provide a flow of cooling air for cooling the cable end and the lamp;
   a blocking device disposed proximate the outlet of the fan assembly for blocking the flow of cooling air through a portion of the outlet of the fan assembly to separate the flow of cooling air into a higher velocity portion for cooling the cable end and a lower velocity portion.

10. The cooling arrangement of claim 9, wherein the fan assembly comprises a tube-axial fan having a generally circular outlet end, and wherein the blocking device comprises a plate disposed over a portion of the outlet.

11. The cooling arrangement of claim 10, wherein the plate covers no more than one-quarter of the area of the outlet.

12. The cooling arrangement of claim 10, wherein the plate covers at least one-quarter of the area of the outlet.

13. The cooling arrangement of claim 9, wherein the blocking device is sized to provide an average velocity in the higher velocity portion that is at least 25% higher than the average velocity in the lower velocity portion.

14. The cooling arrangement of claim 9, wherein the blocking device is sized to provide a velocity in the higher velocity portion that is at least 40% higher than the velocity in the lower velocity portion.

15. A fiber optic lighting device comprising:
   an enclosure;
   a fiber optic cable having an end disposed within the enclosure;
   a lamp disposed proximate the cable end;
   a tube axial fan assembly having an outlet for directing cooling air into the enclosure, the cooling air exiting the outlet having an average velocity across the outlet;
   the outlet further comprising a first portion having an obstruction preventing the flow of cooling air therethrough and a second portion located immediately downstream of the first portion in the direction of rotation of the blades of the fan assembly, the velocity of the cooling air exiting the second portion having a velocity that is higher than the average velocity.

16. The device of claim 15, wherein the fan assembly is located so that the cooling air exiting the second portion is directed to cool the end of the fiber optic cable.

17. The device of claim 15, wherein the obstruction comprises a plate covering the first portion of the outlet.

18. The device of claim 17, wherein the plate covers one quadrant of the outlet.

19. The device of ckaim 15, wherein the obstruction is sized to provide a velocity of the cooling air exiting the second portion that is at least 25% higher than the average velocity.

20. The device of ckaim 15, wherein the obstruction is sized to provide a velocity of the cooling air exiting the second portion that is at least 40% higher than the average velocity.

* * * * *